(12) United States Patent
Barlow (10) Patent No.: US 6,484,259 B1
(45) Date of Patent: Nov. 19, 2002

(54) METHODS AND ARRANGEMENTS FOR MAPPING WIDELY DISPARATE PORTABLE TOKENS TO A STATIC MACHINE CONCENTRIC CRYPTOGRAPHIC ENVIRONMENT

(75) Inventor: Douglas C. Barlow, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/444,137

(22) Filed: Nov. 16, 1999

Related U.S. Application Data (60) Provisional application No. 60/145,450, filed on Jul. 23, 1999.

(51) Int. Cl.[7] ............................... H04L 9/30; H04L 9/32
(52) U.S. Cl. ....................... 713/159; 713/156; 713/157; 705/65; 705/66; 380/30
(58) Field of Search ................................ 713/185, 184, 713/186, 202, 155, 156, 157, 158, 159, 172, 173, 174; 705/65, 66, 67; 380/277, 278, 279, 30

(56) References Cited

U.S. PATENT DOCUMENTS

| | | | | |
|---|---|---|---|---|
| 5,422,953 A | * | 6/1995 | Fischer | 380/23 |
| 5,485,519 A | * | 1/1996 | Weiss | 380/23 |
| 5,659,616 A | * | 8/1997 | Sudia | 380/23 |
| 5,689,565 A | | 11/1997 | Spies et al. | 380/25 |
| 5,721,781 A | | 2/1998 | Deo et al. | 380/25 |
| 5,740,248 A | | 4/1998 | Fieres et al. | 380/25 |
| 5,778,072 A | * | 7/1998 | Samar | 380/30 |
| 5,781,723 A | | 7/1998 | Yee et al. | 395/186 |
| 5,790,668 A | * | 8/1998 | Tomko | 380/25 |
| 5,790,674 A | * | 8/1998 | Houvener et al. | 380/23 |
| 5,850,442 A | * | 12/1998 | Muftic | 380/21 |
| 5,943,423 A | * | 8/1999 | Muftic | 380/25 |
| 6,044,155 A | * | 3/2000 | Thomlinson et al. | 380/49 |
| 6,067,620 A | * | 5/2000 | Holden et al. | 713/155 |
| 6,092,192 A | * | 7/2000 | Kanevsky et al. | 713/186 |

OTHER PUBLICATIONS

Muftic et al., "Security Architecture for Distributed Systems", Butterworth–Heinemann Ltd. Computer Communications vol. 17, No. 7, Jul. 1994.

PKCS #11: Cryptographic Token Interface Standard, An RSA Laboratories Technical Note, Version 1.0, Apr. 28, 1995, pp. 1–127.

PKCS #11: Cryptographic Token Interface Standard, An RSA Laboratories Technical Note, Version 2.0 Draft 2, Jul. 1, 1997, pp. 1–231.

* cited by examiner

Primary Examiner—Justin T. Darrow
(74) Attorney, Agent, or Firm—Lee & Hayes, PLLC

(57) ABSTRACT

Various methods and arrangements are provided to form an interface that allows portable token devices to be used within static machine concentric cryptographic environments. One example of a portable token device is a smart card that can be read or other accessed by a computer through a smart card reader. A cryptographic API, associated with the operating system of the computer, is configured to separate the applications from the cryptographic functions that require the portable tokens. The cryptographic API accesses a smart card cryptographic server provider (SC-CSP) that is configured to work with a smart card cryptographic provider (SCCP) program as part of the interface. This SC-CSP/SCCP interface determines that the requested cryptographic function requires a specific smart card and requests that the user provide the appropriate smart card. The SC-CSP and SCCP are object-oriented and utilize method invocation to provide an efficient and reliable interface that can support a variety of different portable tokens and cryptographic needs.

19 Claims, 3 Drawing Sheets

METHODS AND ARRANGEMENTS FOR MAPPING WIDELY DISPARATE PORTABLE TOKENS TO A STATIC MACHINE CONCENTRIC CRYPTOGRAPHIC ENVIRONMENT

RELATED APPLICATION

This application claims priority from U.S. Provisional Application Ser. No. 60/145,450, filed Jul. 23, 1999, the disclosure of which is incorporated by reference herein.

TECHNICAL FIELD

This invention relates generally to cryptography and, more particularly, to methods and arrangements that allow widely disparate portable tokens to be employed within a static machine concentric cryptographic environment.

BACKGROUND

Cryptography is commonly employed to authenticate data, encode data, or encrypt/decrypt data in a manner that allows the data to be stored and/or transmitted securely. Cryptography is becoming more and more popular as computers and networks increase in number, size and complexity.

By way of example, public/private key pairs are commonly used in personal computers (PCs) to provide asymmetric encryption of data that is exchanged between communicating parties. Asymmetric encryption uses public-key encryption algorithms. Public-key algorithms use two different keys (known as a key pair), namely, a public key and a private key. These two keys are typically derived from extremely large prime numbers making them mathematically related. However, it is practically impossible to derive one key from the other. As suggested by their names, the public key is made public, while the private key is kept private. In a typical static machine concentric PC environment, the private key may never leave the PC on which it was generated.

Information (i.e., data) that is encrypted with either one of the keys can only be decrypted with the other one of the keys. Thus, for example, data encrypted with the private key can only be decrypted with the public key, and vice versa.

Since, public-key algorithms can be somewhat slow, particularly when encrypting large amounts of data, a digital signature can be used instead to sign the data. A digital signature can be produced by passing the data through a specific one-way hashing algorithm. The hashing algorithm produces a much smaller message digest. As a result of the hashing algorithm, the message digest is a unique value that can essentially act as a "fingerprint" for the larger data file. Once a message digest is created, it can be encrypted, for example, using the private key and attached to the larger data file when it is sent or otherwise provided.

As an additional safety measure, a session key may also be used during a communication session. A session key is essentially a temporary private key or secret that is shared between the communicating parties. Upon decrypting the session key the receiving party can further decrypt the encrypted data by running the hash to produce the message digest, and process it as described above.

One problem associated with such cryptography techniques is that a third party might attempt to masquerade as one of the communicating parties, for example, by fraudulently holding out a public key that is represented to be one of the communicating parties public keys. Any messages or hashes that are intended for the communicating party and encrypted with the fraudulent public key could conceivably be decrypted with the accompanying private key by the third party.

To address this problem and others, a digital certificate can be employed by the communicating parties. A digital certificate is a credential issued by a trusted organization or entity called a certification authority (CA), such as, for example, VeriSign, Inc. This credential typically contains a public key and data that identifies the certificate's subject (i.e., the applicable communicating party). A certificate is usually issued by a CA only after the CA has verified the certificate's subject's identity and has confirmed that the public key included with the certificate belongs to that subject. The certificate may also include a digest of the certificate's contents that is signed with the private key of the CA to ensure that the certificate has not been altered or forged.

A CA may also provide self-signed certificates, or root certificates, that are to be inherently trusted. A CA may itself be certified by a hierarchy of other CAs; such information is usually included within the certificate. When a digital certificate is used to sign documents and software, this information is stored with the signed item in a secure and verifiable form that can be displayed to a user to establish a trust relationship.

Over a period of time, digital certificates will tend to accumulate on a PC. These digital certificates are usually collected in a certificate store. Tools are provided, typically as application programming interface (API) functions, that allow the user to store, retrieve, delete, enumerate, verify, or otherwise maintain the digital certificates within the certificate store.

With this in mind, Microsoft Corp. of Redmond, Wash., develops software, operating systems and other applications for use with a variety of "machines", including general and special purpose computers, PCs, portable devices, and the like. Microsoft Corp. has developed a Cryptographic API (hereinafter, generically referred to as "CryptoAPI") that provides a controlled/expandable interface between applications seeking cryptographic services and programs/devices that can provide such cryptographic services. Within CryptoAPI tools (e.g., functions) are provided that can be used to manage the digital certificates in the digital store and attach the digital certificates to data files. For example, CryptoAPI maintains a certificate revocation list (CRL) that is typically issued by the CA and lists digital certificates that are no longer valid. CryptoAPI also supports a certificate trust list (CTL) that identifies items that have been signed by a trusted entity. The various digital certificates, CRLs and CTLs within the certificate store are normally kept in non-volatile memory within the machine, such as, for example, a disk file or the system registry.

The cryptographic programs/devices that can provide the requested cryptographic services may include general purpose and/or special purpose hardware/software that is added to the machine and provides the necessary unique cryptographic token. Thus, for example, CryptoAPI allows new/additional cryptography devices/tokens to be added to the machine and acts as an interface between the requesting application(s) and the added cryptographic device/tokens. This type of API functionality/interface is well known and described in greater detail in U.S. Pat. No. 5,689,565, issued Nov. 18, 1997 to Spies et al.

The above-described API functionality/interface tends to work well with static machine concentric tokens, since it basically assumes that the cryptographic device(s) is fixed in place, always available, and used only by the local machine. However, if some of the tokens are portable, then the API functionality/interface will not always be able to locate the needed token(s).

Consequently, with the recent introduction of smart cards (SCs) and other similar portable token carrying devices, there is a need for improved methods and arrangements that allow widely disparate portable tokens to be used within static machine concentric cryptographic environments. Preferably, these methods and arrangements will provide a generic interface between existing static cryptographic functions and portable cryptographic functions that reduces development efforts/expenditures and increases processing efficiency.

SUMMARY

The present invention provides improved methods and arrangements that can be incorporated into existing static machine concentric machines and/or newly developed appliances to allow a plurality of different portable tokens to be used in support of, or as otherwise necessary for completion of cryptographic functions.

In accordance with certain aspects of the present invention, the methods and arrangements essentially provide a clean and powerful generic interface between the computing machine and the portable token device. Thus, for example, a variety of different portable token vendors may invoke or otherwise access features associated with the present invention in a manner that reduces their development efforts/expenditures while potentially increasing the processing efficiency/capability of their respective products.

Thus, for example, in accordance with certain implementations of the present invention, an arrangement is provided for use with a machine having the capability to operatively couple with at least one removable portable token device. The arrangement includes an operating system having at least one application programming interface (API) that is configured to provide an interface between application programs and a plurality of cryptographic server provider functions. The arrangement further includes at least one portable token cryptographic server provider that is operatively configured to provide an interface between the API and the portable token. At least one portable token service provider is also included in the arrangement. The portable token service provider is operatively configured to use the portable token cryptographic server provider to create an object-based information interface to the cryptographic information maintained within the portable token.

Using this arrangement, for example, portable token vendors are able to develop portable token service providers that rely on the interface and features provided by the developer of the portable token cryptographic server provider. Thus, each portable token and its associated software can interface with the computer through a generic interface.

Thus, in accordance with one exemplary interface method for each portable token, a single card control object is provided that is operatively configured to manage the portable token. From this card control object, at least one container control object is then provided and configured to manage a specific key container. Within a container control object, at least one key pair control object is provided and configured to manage at least one individual key pair maintained within the portable token.

In still another exemplary implementation, an object-based interface arrangement is provided for use within a portable token device. Here, the object-based interface arrangement includes a card control object and at least one container object enumerated under the card control object that includes evidentiary data and associated key data. The evidentiary data can include, for example, digital certificates, certificate lists, etc.

By way of still further example, a portable token apparatus is also provided for use with one or more computers, in accordance with certain aspects of the present invention. Here, the portable token apparatus includes at least one controller, an interface coupled to the controller, and memory coupled to the controller. The memory includes instructions that cause the controller to present the computer with a control object and at least one subordinate container object, when the portable token apparatus is operatively coupled to the computer. Here, the container object includes at least one digital certificate and associated key data.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Overview

The following sections describe an improved interface for use in a computer or like machine. The interface is based on an object-oriented/method invocation methodology that allows the computer operating system and/or sub-components to build reliable interfaces that can locate and activate the necessary removable portable token.

While much of the description builds upon existing features of Microsoft's CryptoAPI based operating system sub-components and related modules, the scope of the invention is much greater and should not be so limited. For example, the interface methods and arrangements define novel demarcation lines for responsibilities and associated abilities of the various developers/vendors and/or their products in an environment that supports both static and portable tokens. As such, these methods and arrangements are portable or otherwise adaptable to other environments, machines, and operating systems.

The description that follows assumes the following general operational environment. The computer operating system is initialized. At some stage during computer operations, the user is prompted or otherwise directed to provide a portable token device, such as, for example, a smart card. The smart card is initialized and the interface presented herein determines which, if any, tokens are present within the smart card. A certificate store within the computer is updated, as needed, to keep track of the tokens on the various static and portable token devices.

As long as the smart card remains available to the computer system, applications can access the cryptographic information/functionality associated with it. If the smart card is removed, then there is a need to locate it again.

Let us assume that the user activates or otherwise selects an application program, such as, for example, an electronic-mail program requiring a portable token located on a smart card that has been removed from a reader attached to the computer. Here, the application requests the cryptographic function from a cryptographic application programming interface (API). The cryptographic API contacts a smart card cryptographic server provider (SC-CSP) that is configured to work with a smart card cryptographic provider (SCCP) program as part of the interface. The SC-CSP/SCCP interface determines that the requested cryptographic function requires the smart card, and requests that the user provide the appropriate smart card. As a result, once the token is verified, then the requested cryptographic function, for example, message encryption, can be provided to the calling electronic-mail application.

Exemplary Computer System

Figure 1:
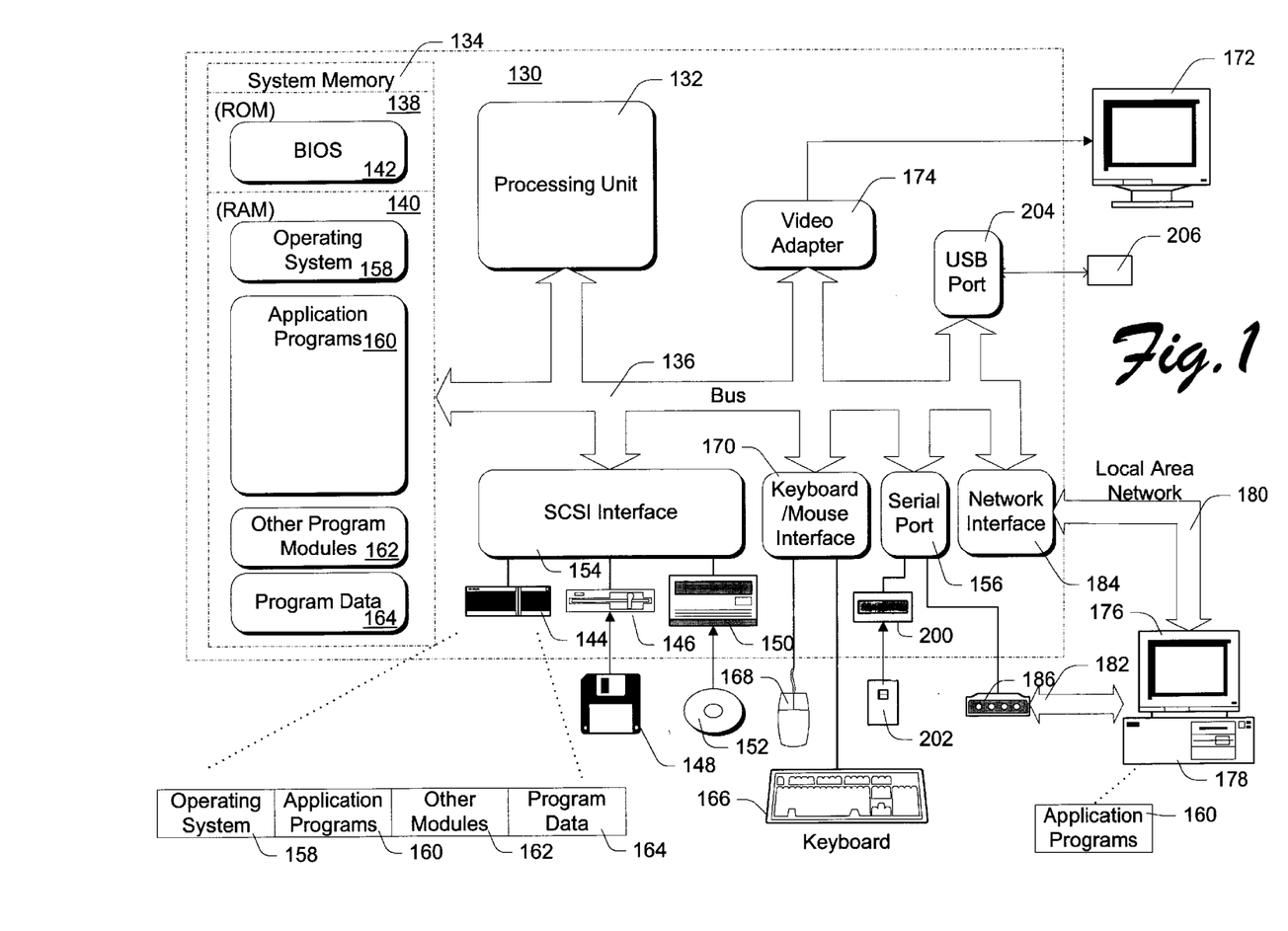
FIG. 1 is a block diagram depicting a computer (machine) suitable for use with the present invention.

FIG. 1 is an illustrative block diagram depicting a general example of a computer 130 that can be used in accordance with the present invention. Various numbers of computers such as that shown can be used in the context of a distributed computing environment. In this document, computers are also referred to as "machines".

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 8. The logical connections depicted in FIG. 8 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

To support the portability of tokens and the associated cryptographic functions that support application programs 160, computer 130 further includes at least one portable token interface. For example, magnetic disk 148 or optical disk 152 may be considered a token carrier or device when encoded with applicable token data/instructions. More likely, however, in the future, the portable token interface will include the coupling of additional hardware to computer 130. Thus, for example, a smart card reader 200 may be connected to bus 136 through a port such as serial port 156, as depicted. Smart card reader 200 is supported by application programs and/or other modules similar to other input/output devices. Smart card reader 200 is configured to receive a smart card 202 and to provide the operative coupling of smart card 202 to processing unit 132. Smart card reader 200 can support a plurality of smart cards.

By way of still further example, a universal serial bus (USB) port 204 may also be coupled to bus 136, as applicable, to support smart card readers and/or other types of portable token devices 206. The basic notion of the portable token device is that it can be provided by the user to one or more computer systems when required to support cryptographic functions.

Exemplary Portable Token Device (A Smart Card)

Figure 2:
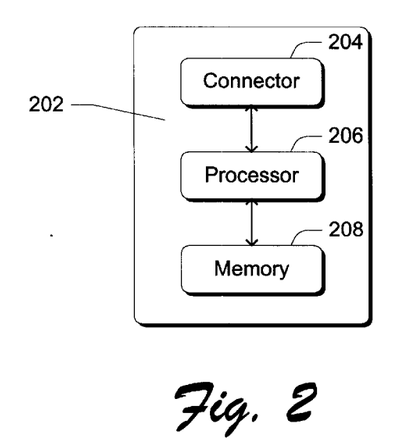
FIG. 2 is a block diagram of a smart card embodiment of a portable token device suitable for use with the computer as depicted in FIG. 1, for example.

FIG. 2 is a block diagram depicting an exemplary smart card 202. As shown, smart card 202 includes a connector 204 coupled to an onboard controller or processor 206. Processor 206 is further coupled to an onboard memory 208. Memory 208 is typically a non-volatile memory that allows smart card 202 to be moved around from machine to machine without loss of data. Processor 206 is responsive to instructions provided via memory 208 and/or computer 130 when smart card 202 is powered on.

Given this configuration, smart cards can be configured to provide significant security for cryptographic keys. Additional security can be provided by requiring the user to enter additional security or identifying data (e.g., a personal identification number (PIN) or string, personal and/or other biometric information/data) in computer 130 when attempting to activate or otherwise access the services provided for by smart card 202. For example, the card holder may be required to enter a PIN to activate the private key, or have their fingerprint scanned. As token carriers, smart card 202 preferably holds at least one asymmetric key pair. Symmetric keys are preferably processed by the more powerful processing unit 132 of computer 130.

Problems may occur in the interface to these smart cards, since smart card developers are usually free to develop/program for their smart cards as they wish. Currently, there are few standards beyond the physical interface level for smart cards. A Public-Key Cryptography Standard #11: Cryptographic Token Interface Standard, available from RSA Laboratories of Redwood City, Calif., is currently in the drafting stage to provide for the use of portable tokens. However, the proposed solutions/interface in the current draft fail to provide a clean/generic interface through the use of various objects and method invocation techniques, as described herein.

Furthermore, there appears to be a general consensus that any specified standard that goes beyond an interface level would be counter-productive to the smart card vendors, each of whom may have their own requirements, standards and practices.

The present invention keeps this in mind by presenting a novel, easy to implement object-oriented approach/interface that allows static machines to operate with portable token devices. In accordance with certain further aspects of the present invention, the burden of developing significant code to support the requisite interface has essentially been shifted to the developer of the operating system and/or subcomponents thereof.

Exemplary Software Architecture

Figure 3:
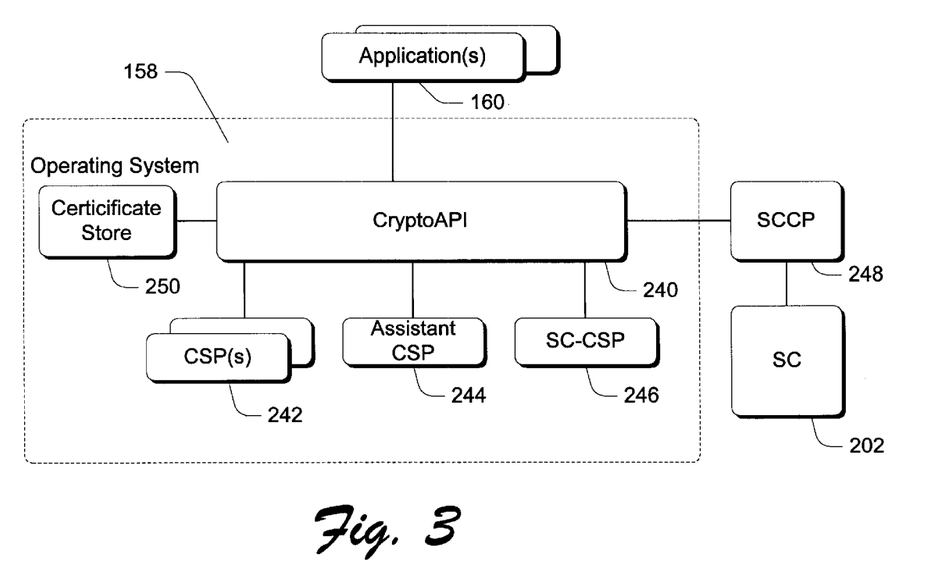
FIG. 3 is an illustrative block diagram of a computer software architecture suitable for use in the computer as depicted in FIG. 1 and the smart card of FIG. 2, for example.

FIG. 3 is a block diagram depicting an exemplary portion of a software architecture suitable for implementing the present invention. As shown, operating system 158 includes an API 240 that operatively and selectively separates applications 160 from various software modules associated with cryptographic functions. By way of example, API 240 can include CryptoAPI available from Microsoft Corp.

When a cryptographic function is required, applications 160 access API 240. API 240 accesses, as applicable, the various software modules associated with the requested cryptographic function. For example, API 240 can be operatively arranged to activate or otherwise access the cryptographic and/or related non-cryptographic functions provided through various cryptographic server providers (CSPs) 242, assistant CSP 244 and smart card CSP (SC-CSP) 246. CSPs 242 may include particular cryptographic functions that support authentication, encoding and encryption/decryption, for example. In this example, it is assumed that CSPs 242 are operatively arranged to support functions provided by one or more static hardware/software token devices. As described in more detail below, assistant CSP 244 and SC-CSP 246 are arranged to support at least one portable token device, in this example, smart card 202. In certain exemplary implementations, assistant CSP 244 and SC-CSP 246 may be combined to form a single module.

API 240 is also configured to maintain at least one certificate store 250, for example, as described in the preceding background section. Digital certificates associated with various smart cards (or other portable token devices) will also be maintained in certificate store 250 through API 240.

A smart card cryptographic provider (SCCP) 248 is also shown as being associated with smart card 202. SCCP 248 and SC-CSP 246 are designed to provide an interface that permits the use and requisite mapping of widely disparate portable tokens to a static machine concentric environment. This interface is described in greater detail below.

Exemplary Object Model

Figure 4:
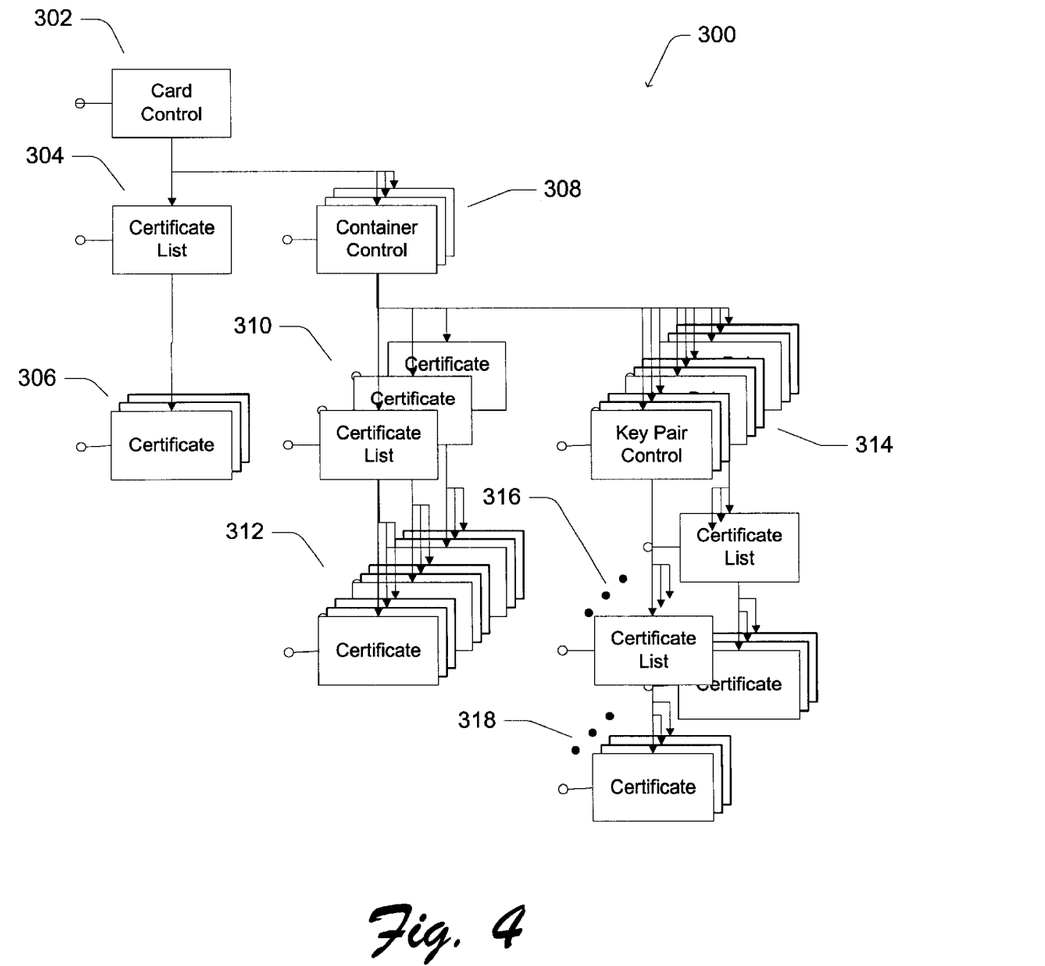
FIG. 4 is an illustrative block diagram of an exemplary object-oriented arrangement suitable for use by the computer software architecture of FIG. 3 to provide an interface between the portable token of FIG. 2 and the computer of FIG. 1, in accordance with certain implementations of the present invention.

Reference is now made to FIG. 4, which depicts an illustrative block diagram of an object-based model that can be used to provide an interface 300 that permits the use of widely disparate portable tokens in a static machine concentric environment, in accordance with certain aspects of the present invention.

Interface 300 provides an object-based arrangement that allows SC-CSP 246 to locate and activate the applicable portable token.

As shown in FIG. 4, within interface 300, for each smart card 202, SC-SCP 246 instantiates a single card control object 302 to manage the target smart card 202 when SCCP 248 is loaded. A certificate list object 304 and/or one or more digital certificate objects 306 can be associated with card control object 302. The certificate list object, which is instantiated by SC-SCP 246, is configured to enumerate over the certificate objects.

From card control object 302, SC-CSP 246 preferably instantiates one or more container control objects 308, for example, by a name or like identifier. Each container control object 308 is configured to manage a specific key container. One or more certificate list objects 310 and/or one or more digital certificate objects 312 can also be associated with each container control object 308.

From each container control object 308, SC-CSP 246 may further instantiate one or more key pair control objects 314, for example, by an integral identifier. Each key pair control object 314 is configured to manage at least one individual key pair that is stored or otherwise maintained within smart card 202. One or more certificate list objects 310 and/or one or more digital certificate objects 312 can also be associated with each container control object 308.

The following sections provide additional details for an exemplary embodiment of interface 300 as implemented for smart card 202, for example, in the arrangement as depicted in FIGS. 1–4, for use with Microsoft's CryptoAPI. It should, however, be kept in mind that the various aspects of the present invention are fully applicable and adaptable to other non-smart card implementations, including those that operate with machines that have other operating system mechanisms/programs that are functionally equivalent to the API 240, SC-CSP 246, and/or SCCP 248.

One of the features of the present invention is that each compliant token carrier, smart card or otherwise, will be arranged to present what appears from the machine to be the same internal structure. Consequently, API 240 can efficiently interact with the token carrier to determine what tokens are available for the applications 160, and maintain certificate stores 250, as needed, to recognize the proper SC-CSP 246 and smart card 202 required to meet subsequent requests for cryptographic functions. Once the necessary smart card has been provided by the user to the computer 130, then cryptographic functions can be provided via one or more CSPs 242, assistant CSP 244, and/or smart card 202.

Exemplary Smart Card Interface Embodiment
SC-CSP Implementation

This section describes certain features associated with the interfaces of the SC-CSP 246 object. In accordance with certain aspects of the present invention, SC-CSP 246 utilizes at least one SCCP 248 to interact with smart card 202. Therefore, it is preferred that SCCP 248 is developed/supplied by the smart card vendor in conjunction with smart card 202.

In order to ensure exportability from the United States, SC-CSP 246 will not perform any cryptographic functions on its own. Instead, it will defer cryptographic service requests to SCCP 248 and/or to at least one other CSP, such as the assistant CSP 244. For example, an existing Microsoft base cryptographic server provider may be used as assistant CSP 244.

SCCP 248 is preferably an in-process component object model (COM) server (e.g., a data link library (DLL)). Preferably, SCCP 248 should be signed and registered within the operating system in order for it to be available for use.

If SC-CSP 246 needs to access or otherwise use a given smart card 202 (portable token) for crypto operations, it will look up the card's SCCP and its signature in a database, such as, for example, the Calais Database. SC-CSP 246 will validate the signature of SCCP 248, and if all is acceptable, perform a CoLoadLibrary call to load SCCP 248 and then instantiate the SCCP interface. SC-CSP 246 may also provide the loaded SCCP 248 with a pointer to an interface supplying methods that provide common services to SCCP developers.

The SCCP interfaces described herein are intentionally designed to not include Type-Library information, or to be trivially called from Basic or Java. This is an exportability feature that encourages applications to use API 240, rather than calling the SCCP interface directly.

SC-CSP 246 is essentially responsible for providing all CSP-related services to the host operating system 158. To accomplish this, SC-CSP 246 relies on SCCP 248 for the following services:

(1) asymmetric key pair generation (helper functions may be supplied);
(2) secure private key storage;
(3) certificate storage and retrieval;
(4) signing and encrypting operations using the stored private keys;
(5) container naming storage; and
(6) certificate fingerprint storage.

In addition, SCCP 248 support administrative services that may be called by SC-CSP 246, or by a related administration utility. Thus the following additional administrative services may be supplied by the SCCP 248:

(7) card initialization;
(8) PIN changing; and
(9) PIN reactivation (if supported).

The following support services are provided to SCCP 248 by SC-CSP 246:

(1) card location and premature removal support;
(2) PIN prompting support, for example, via a common dialog;
(3) key pair generation services;
(4) message digest services;
(5) random number generation;
(6) auxiliary image signature checking; and
(7) data compression.

In addition to various standard CSP-like services offered to applications 160, SC-CSP 246 may also provide other specialized services to SCCP 248. For example, SC-CSP 246 may take on the responsibility of locating the correct smart card 202 to be used for a cryptographic operation, including interacting with the user, if necessary. SC-CSP 246 can also deal with smart card 202 removal warnings from the smart card reader 200, prompting the user to either re-insert smart card 202 or cancel the operation.

One important design feature is that SC-CSP 246 makes requests to SCCP 248 via method invocation. In certain implementations, therefore, SCCP 248 may need authorization to perform some of these tasks. If authorization is required, then it can be requested as a part of the invoked method.

One typical authorization technique is the PIN. Thus, SC-CSP 246 preferably provides a common dialog for PIN prompting. This dialog may offer a "Remember this PIN for the life of the application" checkbox, for example. If the user checks this box, then SC-CSP 246 will store the PIN in memory and will return it to future prompt requests from SCCP 248 without actually putting up a user dialog. PINs, which can be any string, may also be preloaded into a cache by applications using standard API 240 calls. PINs are automatically forgotten if the associated smart card 202 is removed from reader 200. PINs may also be cached per container. Multiple PINs can be distinguished by PIN ID numbers, for example. The PIN prompting dialog may also offer a "Change PIN" option, to allow users to change their PINs, if desired.

SC-CSP 246 provides key pair generation services, should an SCCP 248 require them. SC-CSP 246 may use its assistant CSP 244 to generate a key pair and pass it along to the SCCP 248, for example. SC-CSP 246 can then scrub any memory used to hold the private key.

SC-CSP 246 can also provide a message digest service via its assistant CSP 244. One purpose of this service is to assist SCCP 248 in generating certificate fingerprints. However, SCCP 248 is free to use this service for other purposes too, such as, for example, PIN verification.

SC-CSP 246 can also be configured to provide random number generation services via its assistant CSP 244. Additionally, SC-CSP 246 can provide image validation services, should SCCP 248 need to load additional DLLs.

As mentioned, SC-CSP 246 utilizes the various SCCPs 248 of smart cards 202 to provide services. SC-CSP 246 also utilizes assistant CSP 244 to perform certain further cryptographic functions not provided by the SCCPs.

Since the tokens associated with the smart cards 202 are portable, there are a few special cases of how SC-CSP 246 deals with the standard, well-known, Microsoft CryptoAPI Service Provider interfaces that need to be pointed out. These are noted in the sections below.

CryptAcquireContext

Several special actions, when compared to conventional CSPs, are taken by SC-CSP 246 during context acquisition. They are documented here.

The Flags Parameter:

SC-CSP 246 supports all defined flags for CryptAcquireContext. Of special note are the following:

CRYPT_SILENT—This flag is taken literally, so that absolutely no UI will be placed in front of the user when this flag is in effect. If UI is necessary to continue an operation, the operation fails.

CRYPT_MACHINE_KEYSET—This flag is taken to mean that no cached information should be used, that all information must come from the card itself. This provides the same functionality as the typical meaning of the flag, but makes it more meaningful in the context of removable hardware tokens.

Fully Qualified Container Names

In some instances, the calling application is already aware of which smart card 202 it wishes to talk to, based on the reader 200 it is in. SC-CSP 246 will recognize fully qualified container names, whereby the specific reader 200 containing smart card 202 can be specified in addition to the container name. For example, a fully qualified container name may have the following format:

\\.\<readerName>[\<containerName>]

Where <readerName> represents the friendly name of the smart card reader 200, and <containerName> represents the name of the desired container. If the container name is not specified, or has zero length, the default container for smart card 202 is implied. This also implies that backslashes are not allowed in reader names or container names.

Examples of container names supported by SC-CSP 246 are:

Blank or NULL—Use the default container from smart card 202 supporting cryptographic services chosen by the user through the common smart card dialog. If the CRYPT_SILENT flag is in effect, this name fails.

"MyLogin"—Search for a smart card 202 supporting cryptographic services with a container name of MyLogin. If a certificate for this container is cached, then the card search will be restricted to cards with the same ATR as smart card 202 from which the certificate was contained. If such a smart card 202 is found immediately, then no user interface (UI) is displayed. If no such smart card 202 is available, or if multiple smart cards are available, and the CRYPT_SILENT flag is not in effect, then the common smart card dialog is displayed.

"\\.\Keyboard Reader" or "\\.\Keyboard Reader\"—Use the default container from smart card 202 in reader 200 with the friendly name of Keyboard Reader. If no smart card 202 is there, if it does not support cryptographic services, or if it does not have a default container, an error is returned. As such, no UI will be displayed.

"\\.\Keyboard Reader\MyLogin"—Uses the container named, MyLogin from smart card 202 in reader 200 with the friendly name of Keyboard Reader. If no smart card 202 is there, if it does not support cryptographic services, or if it does not have a container named, MyLogin, then an error is returned and no UI is displayed.

If SC-CSP 246 is asked to return the container name via the CryptGetProvParam service, either through the PP_CONTAINER or PP_ENUMCONTAINERS parameter identifiers, only the container name will be returned, not the Fully Qualified Container Name.

CryptGenKey:

The following flag values of the CryptGenKey service are of special note:

CRYPT_EXPORTABLE—Since this flag exists to allow portability of the private key, and by definition, keys created within smart cards 202 are portable, this flag is simply ignored. Note that requests to export the private key out of smart card 202 will be rejected.

CryptExportKey:

A blob type of PRIVATEKEYBLOB is not supported.

CryptGetProvParam:

The following parameter values of the CryptGetProvParam service are of special note:

PP_ENUMCONTAINERS only returns container names, not Fully Qualified Container Names.

PP_CONTAINER only returns the container name, not the Fully Qualified Container Name.

CryptSetProvParam:

The following parameter values of the CryptSetProvParam are of special note:

PP_ADMIN_PIN—This allows the administrator PIN of smart card 202 to be preset by application 160, to avoid having UI requesting the PIN being displayed.

PP_KEYEXCHANGE_PIN—This allows the access PIN for the Key Exchange Key of the container to be preset by application 160, to avoid having UI requesting the PIN being displayed.

PP_SIGNATURE_PIN—This allows the access PIN for the Signature Key of the container to be preset by application 160, to avoid having UI requesting the PIN being displayed.

The following parameter values of the CryptGetKeyParam service are of special note:

KP_CERTIFICATE returns the certificate associated with the key.

The following parameter values of the CryptSetProvParam are of special note:

KP_CERTIFICATE sets the certificate associated with the key. The public key of the digital certificate must match the public key of the key.

KP_ADMIN_PIN—This allows the administrator PIN of smart card 202 to be preset by application 160, to avoid having UI requesting the PIN being displayed.

KP_KEYEXCHANGE_PIN—This allows the access PIN for this key to be preset by application 160, to avoid having UI requesting the PIN being displayed. The referenced key must be the Key Exchange Key.

KP_SIGNATURE_PIN—This allows the access PIN for this key to be preset by application 160, to avoid having UI requesting the PIN being displayed. The referenced key must be the Signature Key.

SCCP Implementation

This section describes an exemplary SCCP design. SCCP 248 is implemented using COM Objects as graphically depicted in FIG. 4. SC-CSP 246 instantiates a single card control object 302 to manage the target smart card when SCCP 248 is loaded. From that card control object 302, SC-CSP 246 may instantiate one or more container control objects 308, e.g., by name. A container control object 308 manages a specific key container (also known as a keyset). From a container control object 308, SC-CSP 246 may instantiate one or more key pair control objects 314, e.g., by an integral identifier. Key pair control objects 314 manage the individual key pairs stored on smart card 202.

From any of the control objects (i.e., 302, 308 and 314), SC-CSP 246 may instantiate a certificate list object (i.e., 304, 310 and 316, respectively). A certificate list object provides a means to enumerate over a set of certificate objects (306, 312 and 318, as applicable) associated with the control object.

The following interface definition sections define certain attributes, properties and methods, as applicable, which are assigned to the various objects depicted in the interface 300 of FIG. 4. Those skilled in the art will recognize that further attributes, properties and methods may be included to meet certain particular needs of a system, machine, programming environment/language, and/or portable token device(s).

ISccpBase

This section describes the SCCP Base Object, ISccpBase. ISccpBase inherits from IUnknown. It is the interface upon which all SCCP objects are based. This object is never instantiated by itself, but provides the definitions for attribute management services among the other SCCP Interfaces.

Attributes are characteristics of objects that may vary from object to object within a class (unlike properties, which are characteristics of every object from that class). This base class provides a mechanism for getting and setting of these object attributes. As such, there are no attributes or properties defined for the ISccpBase interface, but does include the following methods:

GetAttrib

HRESULT

GetAttrib(
   [in] DWORD dwParamType,
   [in] DWORD dwFlags,
   [out] PBYTE pbBuffer,
   [in, out] LPDWORD pcbBufLen);

This method is used to obtain (get) attributes of the object. Attributes are identified by numeric Id, and are returned as a byte array. Wherein, dwParamType supplies the numeric identifier for the attribute to be obtained; dwFlags supplies any modifier flags; pbBuffer receives the requested attribute value (this parameter may be NULL if only the length of the attribute is required); and pcbBuffer supplies the length of pbBuffer in bytes, and receives the actual number of bytes in the value of the attribute (this value is returned even if insufficient space is available in the pbBuffer array).

SetAttrib

HRESULT

SetAttrib(
   [in] DWORD dwParamType,
   [in] DWORD dwFlags,
   [in] PCBYTE pbParam);

This method is used to modify (set) the value of attributes of the object. Attributes are identified by numeric Id, and are supplied as a byte array whose length can be determined from the value. Here, dwParamType supplies the numeric identifier for the attribute to be modified; dwFlags supplies any modifier flags; and pbParam supplies the new value of the attribute (the length of this buffer is determined by the parameter type and the supplied value).

ISccpControl

This section describes the SCCP Control Object, ISccpControl. It inherits from ISccpBase. It is the interface upon which all SCCP Control Objects are based. This object is never instantiated by itself, but provides the definitions for common services among the other SCCP Control Interfaces.

Specifically, it provides the following features:

(1) Certificate Storage is a mechanism whereby certificates can be associated with a control object. This base class provides a mechanism for enumerating certificates associated with an object.

(2) PIN Management provides the SCCP with PIN dialog and caching services. It also allows the application to preset the PIN, alleviating the need for SC-CSP 246 to display UI.

There are no attributes or properties defined for this interface, however, the following methods are defined:

GetCertifiateList

HRESULT

GetCertifiateList(
   [out] PSCCPCERTLIST *ppCertList);

This method obtains an interface pointer for the single certificate list object associated with the current object. Here, ppCertList receives a pointer to the Interface.

ChangePin

HRESULT

ChangePin(
   [in] LPCTSTR szCurrentPin,
   [in] LPCTSTR szNewPin);

This method allows the caller to change an access PIN associated with the object. PINs are strings, and should not be assumed to be only numeric. Here, szCurrentPin supplies the current PIN, to be used for validation (the SCCP should validate this PIN, and not use any cached PIN for validation to ensure that the request originates from the actual user); and szNewPin supplies the new PIN to be used to validate access to this object.

DeactivatePin

HRESULT

DeactivatePin(
   void);

This method allows the caller to deactivate an access PIN associated with the object. This action may require entry of an administrator-level PIN.

ReactivatePin

HRESULT

ReactivatePin(
   void);

This method allows the caller to reactivate an access PIN associated with the object. The PIN may have been deactivated via the DeactivatePin method, or by security features of smart card 202, such as exceeding a PIN entry retry threshold. It is likely that this action would also require entry of an administrator-level PIN.

ISccpCard

This section describes the Card Control Object Interface, ISccpCard. It inherits from ISccpControl. It is instantiated by a call to CoLoadLibrary. One ISccpCard object is created for each smart card 202 believed to be of the type associated with SCCP 248. SC-CSP 246 will use the Attach and VerifyCard methods prior to performing any other action against smart card 202. After that, Container and/or Certificate management may be performed. No attributes or properties are defined for this interface, however, the following methods are:

Attach

HRESULT

Attach(

[in] SCARDHANDLE hCard,
[in] PSCCPASSISTANT pAssist,
[in] DWORD dwFlags);

This method causes the object to take over management of smart card 202 found at the supplied reader handle. This method may be called at most once per ISccpCard object. The intent of this method is to associate the Card Control Object with a card. This method will be called exactly once by SC-CSP 246, prior to calling any other method. In this example, hCard supplies a handle to smart card 202 and reader 200 against which operations are to be performed; pAssist supplies the address of an ISccpAssistant object, supplying helper routines; and dwFlags supplies any operational modifiers to apply to the control of smart card 202, as a bit mask.

For example, possible bit values include:

CRYPT_MACHINE_KEYSET—Indicates that smart card 202 is not being activated within the context of any user, but of the system itself.

CRYPT_SILENT—Indicates that SCCP 248 may not perform any interaction with the user, such as prompting for PINs, etc. If any following method for this object or any object derived from it finds that user interaction is necessary to continue the operation, then the operation should simply fail, returning a suitable error code. This flag could be used by unattended operations, or by system processes that do not have a graphical user context. Note that this implies that the ISccpCard Interface should not attempt communication with the user prior to the invocation of this method.

VerifyCard
HRESULT
VerifyCard(
    void);

This method ensures that the attached card is appropriate for use by SCCP 248. The technique used to determine this is SCCP-dependent. This method will be called exactly once by SC-CSP 246, immediately following a call to the Attach method. If this method returns an error, no other operation will be performed by SC-CSP 246 except Release. Smart card 202 will have been accessed with the following characteristics:

Share Mode—SCARD_SHARE_SHARED
Preferred Protocols—SCARD_PROTOCOL_T0|SCARD_PROTOCOL_T1

Upon acceptance of smart card 202, the SCCP's VerifyCard service may wish to use the SCardReconnect service to modify these defaults.

CanCreateContainer
HRESULT
CanCreateContainer(
    void);

This method is called by SC-CSP 246 to determine whether the attached smart card 202 is viable for creating a new container. Typically, if no containers have yet been created on smart card 202, this method would return success. Alternatively, if smart card 202 can support multiple containers, this method would return success provided there was adequate space in memory 208 for an additional container. Implementations of this method should err on the side of optimism—if there might be room for another container, this method should succeed.

InitializeCard
HRESULT
InitializeCard(
    void);

This method sets the attached smart card 202 to an initial state, containing no keys, containers, or certificates.

ResetContainerEnumeration
HRESULT
ResetContainerEnumeration(
    void);

This method prepares the NextContainer method to enumerate over all Container names currently stored in smart card 202. If containers are added to smart card 202, there is no guarantee that they will be in the enumeration unless ResetContainerEnumeration is called after they have been added.

NextContainer
HRESULT
NextContainer(
    [out] LPTSTR szContainer,
    [in, out] LPDWORD pcchContainerLength);

The NextContainer method returns a name of a container that is stored in smart card 202. If called repeatedly, this method will return all containers that exist in smart card 202 exactly once. The enumeration may be reset using the ResetContainerEnumeration method. There is no guarantee that a container added to smart card 202 after a call to ResetContainerEnumeration will be enumerated by this service. No particular return order is guaranteed by this service. In this example, szContainer receives the name of a container on smart card 202, and pcchContainerLength supplies the length of the szContainer buffer, in characters, and receives the length of the container name string, in characters, including the trailing null character. This value is returned even if the szContainer buffer is not large enough to receive the container name.

CreateContainer
HRESULT
CreateContainer(
    [in] LPCTSTR szContainer,
    [out] PSCCPCONTAINER *ppContainer);

This method is used to create a new named container on the attached smart card 202. A pointer to an ISccpContainer object in charge of managing the newly created container is returned. Here, szContainer supplies the name to be assigned to the new container, and ppContainer receives a pointer to a newly created container object in charge of the new container.

OpenContainer
HRESULT
OpenContainer(
    [in] LPCTSTR szContainer,
    [out] PSCCPCONTAINER *ppContainer);

This method is used to access an existing container on the attached smart card 202. A pointer to an ISccpContainer object in charge of managing the existing named container is returned. In this example, szContainer supplies the name of the container to be opened, and ppContainer receives a pointer to a newly created container object in charge of the existing container.

DeleteContainer
HRESULT
DeleteContainer(
    [in] LPCTSTR szContainer);

This method is used to delete an existing container and all of its associated keys on the attached smart card 202. Here, szContainer supplies the name of the container to be deleted.

ISccpContainer

This section describes the Container Control Object Interface, ISccpContainer. It inherits from ISccpControl. It is responsible for providing access to individual key pairs within the container, identified by integral identifier. There are no attributes defined for this interface. There is at least one property defined for this interface, namely, a read-only szContainerName property that defines a string containing the name of this container.

The following methods are also defined for ISccpControl:
ResetKeyPairEnumeration
HRESULT
ResetKeyPairEnumeration(
    void);

This method prepares the NextKeyPair method to enumerate over all the Key Pairs currently in the Container. If key pairs are added to the container, there is no guarantee that they will be in the enumeration unless ResetKeyPairEnumeration is called after they have been added.
NextKeyPair
HRESULT
NextKeyPair(
    [out] LPDWORD pdwKeyPair);

The NextKeyPair method returns the integral identifier of a Key Pair that is stored in the Container. If called repeatedly, this method will return all Key Pairs that exist in the Container exactly once. The enumeration may be reset using the ResetCertificateList method. There is no guarantee that a key pair added to the container after a call to ResetKeyPairEnumeration will be enumerated by this service. No particular return order is guaranteed by this service. In this example, pdwKeyPair receives the integral identifier of a Key Pair representing the next key pair in the enumeration.
CreateKeyPair
HRESULT
CreateKeyPair(
    [in] DWORD dwKeySpec,
    [out] PSCCPKEYPAIR *ppKeyPair);

This method creates a new key pair within the container on smart card 202. Examples of typical values for dwKeySpec are KEY_EXCHANGEKEY and KEY_SIGNATURE. Here, dwKeySpec supplies the integral identifier of the key pair to be created, and ppKeyPair receives a pointer to a newly created Key Pair Control Object in charge of the new key pair.
OpenKeyPair
HRESULT
OpenKeyPair(
    [in] DWORD dwKeySpec,
    [out] PSCCPKEY *ppKeyPair);

This method accesses an existing key pair within the container on smart card 202. Examples of typical values for dwKeySpec are KEY_EXCHANGEKEY and KEY_SIGNATURE. In this example, dwKeySpec supplies the integral identifier of the existing key pair to be accessed, and ppKeyPair receives a pointer to a newly created Key Pair Control Object in charge of the existing key pair.
DeleteKeyPair
HRESULT
DeleteKeyPair(
    [in] DWORD dwKeySpec);

This method removes an existing key pair from within the container on smart card 202. Examples of typical values for dwKeySpec are KEY_EXCHANGEKEY and KEY_SIGNATURE. If a key pair is removed, any associated certificates must also be removed. In this example, dwKeySpec supplies the integral identifier of the existing key pair to be deleted.

ISccpKeyPair

This section describes the Key Pair Control Object Interface, ISccpKeyPair. It inherits from ISccpControl. This interface provides access to the services of the stored key pair.

The following attributes are defined for ISccpKeyPair, based on the key pair algorithm:

| Attribute | Description | Type |
|---|---|---|
| a) RSA | | |
| KP_KEYVAL | RSA Public Key Value | Read Only |
| KP_PUB_EX_LEN | RSA Public Key Exponent Length | Read Only |
| KP_PUB_EX_VAL | RSA Public Key Exponent | Read Only |
| KP_KEYLEN | Length of key in bits | Read Only |
| b) DSS | | |
| KP_KEYLEN | Length of key in bits | Read Only |
| KP_P | DSS/Diffie-Hellman P value | Read Only |
| KP_G | DSS/Diffie-Hellman G value | Read Only |
| KP_Q | DSS Q value | Read Only |
| c) Diffie-Hellman | | |
| KP_KEYLEN | Length of key in bits | Read Only |
| KP_P | DSS/Diffie-Hellman P value | Read Only |
| KP_G | DSS/Diffie-Hellman G value | Read Only |
| KP_X | Diffie-Hellman X value | Read Only |
| KP_Y | Y value | Read Only |
| d) Fortezza | | |
| KP_KEYLEN | Length of key in bits | Read Only |
| KP_RA | Fortezza RA value | Read Only |
| KP_RB | Fortezza RB value | Read Only |

The following properties are defined for ISccpKeyPair:

| Property | Description | Type |
|---|---|---|
| dwAlgId | Key algorithm identifier, returned as an unsigned long integer. Possible values include:<br>• CALG_RSA_SIGN<br>• CALG_DSS_SIGN<br>• CALG_RSA_KEYX<br>• CALG_DH_SF<br>• CALG_DH_EPHEM<br>• CALG_KEA_KEYX<br>• CALG_SKIPJACK | Read Only |
| cbSignSize | An unsigned long integer representing the number of bytes of data that the key pair can process in Sign operations. | Read Only |
| cbDecryptSize | An unsigned long integer representing the number of bytes of data that the key pair can process in Decrypt operations. | Read Only |

The following methods are defined for ISccpKeyPair:
Sign
HRESULT
Sign(
    [in] PCBYTE pbClear,
    [in] DWORD cbClearLen,
    [out] PBYTE pbCypher,
    [in, out] LPDWORD pcbCypherLen);

This method performs a signing operation using the private key from the identified key pair. Data to be signed will typically be in the form of PKCS-1 Block Type 1, and will be sized appropriately for the represented key pair, where appropriate. Note: Signing and Decrypting are identical services when using RSA. In this example, pbClear supplies a buffer containing the hash value to be signed (represented in PKCS-1 Block Type 1 format); cbClearLen supplies the length of the hash value (in bytes); pbCypher receives the signed version of this hash (where appropriate, e.g., the value shall be returned in little-endian format); and pcbCypherLen supplies the size of the pbCypher buffer (in bytes) and receives the actual number of bytes in the signature.

Decrypt
HRESULT
Decrypt(
   [in] PCBYTE pbCypher,
   [in] DWORD cbCypherLen,
   [out] PBYTE pbClear,
   [in, out] LPDWORD pcbClearLen);

This method performs a decryption operation using the private key from the identified key pair. Data to be decrypted will typically result in the form of PKCS-1 Block Type 2, and will be sized appropriately for the represented key pair, where appropriate. Note: Signing and Decrypting are identical services when using RSA. Here, pbCypher supplies a buffer containing the data to be decrypted, represented in an encrypted PKCS-1 Block Type 2 format (where appropriate, the value shall be supplied in little-endian format); cbCypherLen supplies the length of the encrypted data (in bytes); pbClear receives the decrypted data (still in its PKCS-1 Block Type 2 format), and pcbClearLen supplies the size of the pbClear buffer (in bytes) and receives the actual number of bytes in the decrypted data.

ISccpCertificateList

This section describes the Certificate List Object Interface, ISccpCertificateList. It inherits from ISccpBase. A Certificate List Object provides enumeration services over a set of Certificate Objects. No ordering is imposed on this enumeration. Typical usage is to call the ResetCertificateEnumeration method to prepare to enumerate the Certificates, then to call NextCertificate repeatedly until an error is returned indicating that all Certificate Objects have been returned. There are no attributes defined for this interface.

The following property, is defined for ISccpCertificateList:

| Property | Description | Type |
| --- | --- | --- |
| dwFlags | An unsigned long integer representing a bit mask of capabilities for this certificate list. Possible bit settings include:<br>• SCCP_CRTL_FLAG_READONLY -<br>The certificate list does not permit modifications. | Read Only |

The following methods are defined for ISccpCertificateList:

ResetCertificateEnumeration
HRESULT
ResetCertificateEnumeration(
   void);

This method prepares the NextCertificate method to enumerate over all Certificate Objects currently in the Certificate List. If certificates are added to the Certificate List, there is no guarantee that they will be in the enumeration unless ResetCertificateEnumeration is called after they have been added.

NextCertificate
HRESULT
NextCertificate(
   [out] PSCCPCERT *ppCertificate);

The NextCertificate method returns a pointer to a Certificate Object that is stored in the Certificate List. If called repeatedly, this method will return all Certificate Objects that exist in the Certificate List exactly once. The enumeration may be reset using the ResetCertificateEnumeration method. There is no guarantee that a certificate added to the list after a call to ResetCertificateEnumeration will be enumerated by this service. In this example, ppCertificate receives a pointer to a newly created Certificate Object representing the next certificate in the enumeration.

AddCertificate
HRESULT
AddCertificate(
   [in] PCBYTE pbCertificate,
   [in] DWORD cbCertLength);

This method adds a certificate to the certificate list. The certificate must meet any criteria associated with the list. For example, a certificate list associated with a key pair will typically only contain certificates vouching for the public key of that key pair. It is possible that the added certificate might not be returned by a call to NextCertificate until after a ResetCertificateEnumeration call has been performed. Here, pbCertificate supplies the certificate to be added to the list, and cbCertLength supplies the length of the certificate, in bytes.

ISccpCertificate

This section describes the Certificate Object Interface, ISccpCertificate. It inherits from ISccpBase. It provides a means to refer to a specific certificate within the certificate list. There are attributes or properties defined for this interface.

The following methods are defined for IsccpCertificate:
GetCertificate
HRESULT
GetCertificate(
   [out] PBYTE pbCertificate,
   [out] LPDWORD pcbCertLength);

This method extracts the certificate from smart card 202. In this example, pbCertificate receives the certificate (if this value is NULL, then only the length of the certificate is to be returned), and pcbCertLength supplies the length of the pbCertificate buffer in bytes, and receives the actual length of the certificate. The length value is returned even if there is insufficient space in the pbCertificate parameter to contain the certificate.

RemoveCertificate
HRESULT
RemoveCertificate(
   void);

This method causes the referenced certificate to be removed from the list.

ReplaceCertificate
HRESULT
ReplaceCertificate(
   [in] PCBYTE pbCertificate,
   [in] DWORD cbCertLength);

This method updates the certificate on smart card 202 with a new certificate. The old certificate is forgotten or otherwise removed. Here, pbCertificate supplies the new value for the certificate in the list, and cbCertLength supplies the length of the certificate, in bytes.

Services Available to SCCPs

SC-CSP 246 may also provide certain services to SCCP 248. For example, when card control object 302 is activated, SC-CSP 246 may supply a pointer to a helper interface or like function that provides a few common support services, some of which may be used to activate any number of other miscellaneous support interfaces which may be used to simplify the implementation of SCCP 248. Data compression is one potential service.

ISccpAssistant

This section describes the SCCP Assistant Interface, ISccpAssistant. It inherits from IClassFactory, in order to provide access to other Interfaces. It provides a few common services, and provides access to a collection of utility interfaces, which may make developing SCCP 248 easier. Some interfaces may not be available through regular IClassFactory interfaces due to export restrictions. No properties are defined for this interface, however, the following methods are:

CreateInstance
HRESULT
CreateInstance(
    [in, unique] IUnknown *pUnkOuter,
    [in] REFIID riid,
    [out, iid_is(riid)] void **ppvObject);

This method activates the identified interface. For example, see the IClassFactory interface definition for the description of the individual parameters.

VerifyImage
HRESULT
VerifyImage(
    [in] LPTSTR szImage,
    [in] PCBYTE pvReserved,
    [in] PCBYTE rgbSignature,
    [in] DWORD cbSigLen);

The VerifyImage method is used to verify the signature of images prior to loading them into the address space. In this example, szImage supplies the path name of the image to validate, pvReserved is reserved for future use, rgbSignature supplies the signature of the image, and cbSigLen supplies the length of the signature.

GetPin
HRESULT
GetPin(
    [in] DWORD dwPinId,
    [in] LPCTSTR szMessage,
    [in] DWORD dwMessageId,
    [in] LPCTSTR rgszParams[ ],
    [in] DWORD Flags,
    [out] LPTSTR szPin,
    [in, out] LPDWORD pcchPinLen);

The GetPin method invokes any necessary UI to prompt the user for a PIN necessary to complete the requested action. An application 160 may request that SC-CSP-related and SCCP UI be disabled. If this is in effect, then this method will return an error, indicating that the action should not be allowed to proceed. If UI is presented to the user, they are given the option to have SC-CSP 246 remember this PIN until the application exits or until the associated smart card 202 is removed, whichever comes first. When the user chooses this option, the next time this PIN Id is requested, no UI will be presented to the user, and the PIN will be fetched from an internal cache. Here, the dwPinId value identifies the PIN being requested.

For example, the following values may be predefined:

PIN_EXCHANGEKEY: The PIN being requested is used to activate the Exchange Key Pair.

PIN_SIGNATURE: The PIN being requested is used to activate the Signature Key Pair.

PIN_SECOFFICER: The PIN being requested is used to enable management of smart card 202.

In the GetPin method, szMessage is a parameter that may be NULL, in which case it is ignored. If it is not NULL, then szMessage supplies a message to be displayed to the user should UI be necessary to obtain the PIN. If the MessageId parameter is zero, or if szMessage in non-NULL, then MessageId is ignored. Otherwise, it specifies a string identifier contained in the SCCP image to be loaded and used as a message to be displayed to the user should UI be necessary to obtain the PIN.

The rgszParams parameter may be NULL, in which case it is ignored. It is also ignored if both szMessage is NULL and dwMessageId is zero. Otherwise, it is taken as the address of a null-terminated array of null-terminated strings to be used in substitutions of the supplied message string or Id.

With regard to the dwFlags parameter, it supplies flags used for controlling the operation of the service. Thus, for example, the following flags may be supported:

UIFLAG_DONTCACHE—This flag prevents any PIN obtained from the user to not be cached for later use. This flag is ignored if the PIN is already in the cache.

UIFLAG_CLEARCACHE: This flag clears any previous PIN stored in the cache for this key pair, and re-prompts the user for the PIN. If UI is blocked, either from the application via the PP_DISABLE_UI attribute or via the UIFLAG_DISABLE_UI flag, an error indicating that UI could not be performed will be returned, but the cache will still be cleared. If the UIFLAG_DONTCACHE flag is also set, the PIN will not be placed into the cache, even if it was there prior to clearing the cache.

UIFLAG_DISABLE_UI: This flag forces the call to not put up UI. If the PIN is not in the SC-CSP PIN Cache, the method returns an error. Using this flag in conjunction with UIFLAG_CLEARCACHE results in the PIN being removed from the cache with no further action.

Finally, in the GetPin method above, szPin receives the requested PIN as a NULL-terminated string, and pcchPinLen supplies the length of the szPin buffer in characters, and receives the returned length of the PIN, excluding the trailing NULL character.

GenerateKeyPair
HRESULT
GenerateKeyPair(
    [in] DWORD dwAlgId,
    [in] DWORD dwFlags,
    [in] PCBYTE pvParams,
    [out] PBYTE pvNewKeyPair,
    [in, out] LPDWORD pcbKeyPairLen);

This method generates a key pair for SCCP 248. Here, dwAlgId supplies an identifier for the type of key pair to be generated. For example, the following algorithm Ids may be supported:

CALG_RSA_SIGN: Generate an RSA Signature key pair.

CALG_RSA_KEYX: Generate an RSA Key Exchange key pair.

In the GenerateKeyPair method, dwFlags is reserved for future use, and must be zero, and pvParams supplies a structure controlling generation parameters for the new key pair. The actual required structure is dependent on the algorithm specified in dwAlgId. The pvNewKeyPair parameter receives the newly generated key pair. The structure of this returned value is dependent on the algorithm specified in dwAlgId. The pcbKeyPairLen parameter supplies the size of the pvNewKeyPair buffer in bytes, and receives the length of the actual returned structure, in bytes.

MessageDigest
HRESULT
MessageDigest(
  [in] DWORD dwAlgId,
  [in] PCBYTE pbDataBlob,
  [in] DWORD cbBlobLength,
  [out] PBYTE pbDigest,
  [in, out] LPDWORD pcbDigestLen);

This method provides simple message digest services, suitable for certificate fingerprinting. In this example, dwAlgId supplies the identifier of the hash algorithm to be used, pbDataBlob supplies the data to be hashed, cbBlobLength supplies the length of the data to be hashed (in bytes), pbDigest: receives the resulting digest, and pcbDigestLen supplies the length of the pbDigest buffer, and receives the actual length of the resulting digest.

GenRandom
HRESULT
GenRandom(
  [out] PBYTE pbBuffer,
  [in] DWORD cbBufferLen);

This method supplies a stream of random bytes. Here, pbBuffer receives the randomly generated bytes, and cbBufferLen supplies the length of the pbBuffer, in bytes.

Those skilled in the art will appreciate that the various methods and arrangement described herein provide an efficient method for integrating portable token devices into static machine concentric cryptographic environments. Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A hierarchical object-based interface method for use in a machine capable of connecting to portable-token devices, the interface method comprising:
  identifying when a portable-token device has been connected to the machine;
  upon identifying that the portable-token device has been connected to the machine, causing a processing unit within the machine to instantiate portable-token device control object logic operatively configured to manage the portable-token device;
  causing the portable-token device control object logic to further instantiate container control object logic operatively configured to manage a specific key container associated with the portable-token device;
  causing the container control object logic to further instantiate key pair control object logic operatively configured to manage individual key pairs provided by the portable-token device; and
  causing at least one control object logic selected from a group of control object logic that includes the portable-token device control object logic, the container control object logic and the key pair control object logic to further instantiate certificate list object logic operatively configured to enumerate over a set of certificate objects associated with the at least one control object.

2. The interface method as recited in claim 1, wherein causing the processing unit within the machine to instantiate the portable-token device control object logic further includes instantiating a single portable-token device control object.

3. The interface method as recited in claim 2, wherein causing the portable-token device control object logic to further instantiate the container control object logic further includes instantiating one or more container control objects.

4. The interface method as recited in claim 3, wherein causing the container control object logic to further instantiate the key pair control object logic further includes instantiating one or more key pair control objects.

5. The interface method as recited in claim 4, wherein providing the certificate list object further includes instantiating the certificate list object from at least one control object selected from a set comprising the single portable-token device control object, the one or more container control objects, and the one or more key pair control objects.

6. The interface method as recited in claim 1, wherein the set of certificate objects includes evidentiary data and associated key data.

7. The interface method as recited in claim 6, wherein the evidentiary data includes digital certificate data.

8. The interface method as recited in claim 6, wherein the evidentiary data includes biometric data associated with a user.

9. The interface method as recited in claim 1, wherein the portable-token device includes a smart card.

10. The interface method as recited in claim 1, wherein the portable-token device control object logic, the container control object logic, the key pair control object logic, and the certificate list object logic are associated with portable-token device cryptographic server provider (CSP) logic configured to pass cryptographic data to one or more applications operatively configured to run on the processing unit.

11. A computer-readable medium having computer-executable instructions for performing acts comprising:
  within a machine that is configurable to connect to at least one portable-token device, establishing a hierarchical object-based interface by
  identifying when a portable-token device has been connected to the machine,
  causing a processing unit within the machine to instantiate portable-token device control object logic operatively configured to manage the portable-token device,
  causing the portable-token device control object logic to further instantiate container control object logic operatively configured to manage a specific key container associated with the portable-token device,
  causing the container control object logic to further instantiate key pair control object logic operatively configured to manage individual key pairs provided by the portable-token device, and
  causing at least one control object logic selected from a group of control object logic that includes the portable-token device control object logic, the container control object logic and the key pair control object logic to further instantiate certificate list object logic operatively configured to enumerate over a set of certificate objects associated with the at least one control object.

12. The computer-readable medium as recited in claim 11, wherein causing the processing unit within the machine to instantiate the portable-token device control object logic further includes instantiating a single portable-token device control object.

13. The computer-readable medium as recited in claim 12, wherein causing the portable-token device control object logic to further instantiate the container control object logic further includes instantiating one or more container control objects.

14. The computer-readable medium as recited in claim 13, wherein causing the container control object logic to further instantiate the key pair control object logic further includes instantiating one or more key pair control objects.

15. The computer-readable medium as recited in claim 11, wherein the set of certificate objects includes evidentiary data and associated key data.

16. The computer-readable medium as recited in claim 15, wherein the evidentiary data includes digital certificate data.

17. The computer-readable medium as recited in claim 15, wherein the evidentiary data includes biometric data associated with a user.

18. The computer-readable medium as recited in claim 11, wherein the portable-token device includes a smart card.

19. The computer-readable medium as recited in claim 11, wherein the portable-token device control object logic, the container control object logic, the key pair control object logic, and the certificate list object logic are associated with portable-token device cryptographic server provider (CSP) logic configured to pass cryptographic data to one or more applications operatively configured to run on the processing unit.

* * * * *